(12) United States Patent
Kisse et al.

(10) Patent No.: US 7,975,787 B2
(45) Date of Patent: Jul. 12, 2011

(54) LOW MOUNT THREE POINT ENGINE AND PUMP MOUNTING

(75) Inventors: Brandon J. Kisse, Kindred, ND (US);
Mark R. Murphy, Gwinner, ND (US);
Shannon L. Reardon, Lisbon, ND (US)

(73) Assignee: Clark Equipment Company, West Fargo, ND (US)

( * ) Notice: Subject to any disclaimer, the term of this patent is extended or adjusted under 35 U.S.C. 154(b) by 227 days.

(21) Appl. No.: 12/266,262

(22) Filed: Nov. 6, 2008

(65) Prior Publication Data

US 2010/0107453 A1 May 6, 2010

(51) Int. Cl.
*B60K 25/06* (2006.01)

(52) U.S. Cl. ....... 180/53.1; 180/291; 180/902; 248/560; 37/195

(58) Field of Classification Search .................. 180/53.1, 180/291, 298, 299, 300, 312, 902; *B60K 5/00*
See application file for complete search history.

(56) References Cited

U.S. PATENT DOCUMENTS

| | | | |
|---|---|---|---|
| 2,344,735 A | 3/1944 | Rockwell | |
| 3,747,879 A | 7/1973 | Houk | |
| 4,403,762 A | 9/1983 | Cogswell, II et al. | 248/559 |
| 5,035,397 A | 7/1991 | Yamada | 248/638 |
| 6,085,858 A * | 7/2000 | Wakana et al. | 180/300 |
| 7,040,446 B2 | 5/2006 | Anzai | 180/312 |
| 7,111,705 B2 | 9/2006 | Ohta | 267/140.11 |
| 7,353,697 B2 | 4/2008 | Akkerman | 73/117.3 |
| 7,708,103 B2 * | 5/2010 | Okuyama et al. | 180/299 |
| 2005/0223786 A1 | 10/2005 | Akkerman | 73/117.3 |
| 2006/0276304 A1 * | 12/2006 | Jensen et al. | 477/205 |
| 2008/0078917 A1 * | 4/2008 | Roehrl et al. | 248/555 |

* cited by examiner

*Primary Examiner* — J. Allen Shriver, II
*Assistant Examiner* — James Triggs
(74) *Attorney, Agent, or Firm* — John D. Veldhuis-Kroeze; Westman, Champlin & Kelly, P.A.

(57) ABSTRACT

An attachment system to fasten a power system to a frame of a loader is discussed. The frame has a proximal end, a distal end, and first and second opposing sides. The power system has an engine, and an arrangement of one or more hydraulic pumps attached to the engine. The attachment system has first and second connection points positioned in close proximity to a center of gravity of the power system relative to the direction between the proximal and distal ends of the loader. The attachment system also has a third connection point positioned distally from the first and second connection points, wherein the positions of the first, second and third connection points connect the power system to the frame to allow most of the weight of the power system to be loaded onto the first and second connection points.

14 Claims, 5 Drawing Sheets

LOW MOUNT THREE POINT ENGINE AND PUMP MOUNTING

BACKGROUND

The present discussion is related to power machines, such as a wheeled loader having an engine-powered drive system. The present discussion is more particularly related to systems and methods for mounting the engine-powered drive system to a frame of the loader.

Power machines such as skid steer loaders, tracked vehicles, mini-excavators, utility vehicles, wheel loaders and the like have high utility in construction, landscaping, agriculture, and many other types of applications. Power machines of this type have engines that supply power to drive systems, which transmit the supplied power to a form that can be used to cause the power machine to move. Power systems such as engines and drive systems are necessarily attached to the frame of the machine. Such systems are known to vibrate due to the activity required to generate the necessary power. It is advantageous to attach the engine and drive systems to the frame in such a way as to minimize the transfer of vibration between the frame and the engine and drive systems.

SUMMARY

In one aspect, a loader is discussed. The loader has a frame with a proximal end, a distal end, and first and second opposing sides, an engine, and a drive system operably coupled to the engine for causing the loader to move relative to a support surface. The drive system includes an arrangement of one or more hydraulic pumps attached to the engine to form, with the engine, a power system. The power system is positioned within the frame of the loader. The loader further includes an attachment system to fasten the power system to the frame. The attachment system has first and second connection points positioned in close proximity to a center of gravity of the power system relative to the direction between the proximal and distal ends of the loader and a third connection point positioned distally from the first and second connection points. The positions of the first, second and third connection points connect the power system to the frame to allow most of the weight of the power system to be loaded onto the first and second connection points.

In another aspect, an attachment system for attaching a power system to a frame of a power machine is discussed. The power machine has a proximal and a distal end, opposing first and second sides, and a top and a bottom. The power system includes an engine and one or more hydraulic pumps attached to the engine. The center of gravity of the power system is defined by the distribution of mass in the engine and the one or more hydraulic pumps with respect to a proximal to distal direction, a first to second side direction and a top to bottom direction. The attachment system includes first, second, and third connection points for connecting the power system to the frame. Each of the first and second connection points are positioned in close proximity to the center of gravity with respect to the proximal to distal direction of the power system. The third connection point is located away from the center of gravity towards the distal end in the proximal to distal direction.

In yet another aspect, a method of attaching a power system to a frame of a loader is discussed. The method includes positioning the power system, which includes an engine and one or more hydraulic pumps coupled to the engine relative to the frame so that the power system can be attached to the frame at selected first, second, and third connection points on the power system. The first and second connection points are positioned in close proximity to a center of gravity of the power system as it relates to a proximal to distal direction of the frame. The third connection point is positioned toward a distal end of the frame relative to the center of gravity of the power system. The method further includes attaching the power system to the frame at the first, second and third connection points.

While the above-identified figures set forth one or more illustrative embodiments, other embodiments are also contemplated, as noted herein. In all cases, concepts presented herein describe the embodiments by way of representation and not by limitation. It should be understood that numerous other modifications and embodiments can be devised by those skilled in the art which fall within the scope and spirit of the principles of the discussion herein.

DETAILED DESCRIPTION

Figure 1:
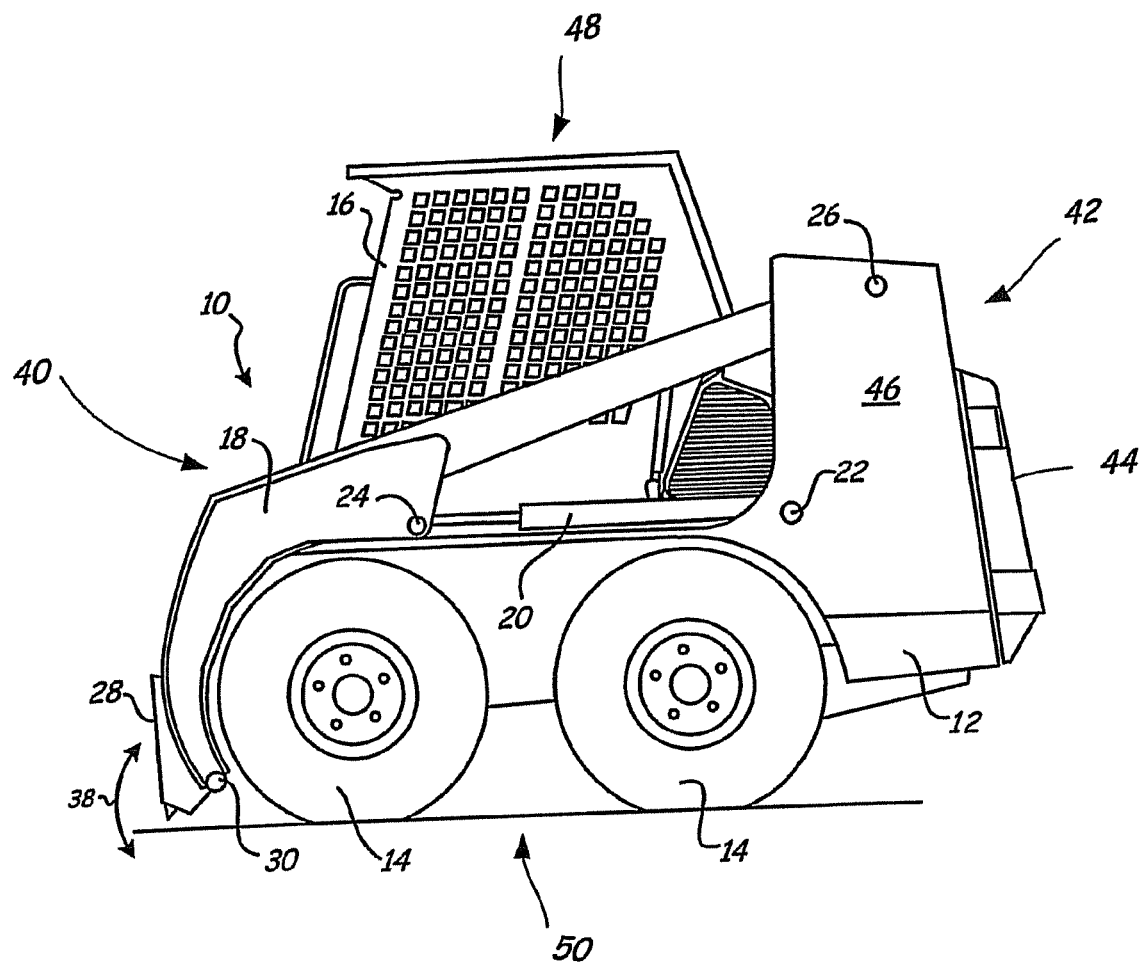
FIG. 1 is a side elevation view of a power machine of the type in which a mounting system for an engine and related power components discussed herein might be useful.

FIG. 1 illustrates a power machine 10 of the type in which an engine and pump mounting arrangement of the type discussed in the embodiments below can be usefully employed. Power machine 10 includes a frame 12 that is supported by wheels 14. Power machine 10 has an engine (not shown in FIG. 1) that applies power to a drive system (not shown in FIG. 1), which in turn supplies power to the wheels 14 causing power machine 10 to move under the control of an operator. Examples of drive systems for use in power machine 10 will be discussed in more detail below. Frame 12 supports a cab 16, which defines an operating compartment.

An operator can be located inside the cab 16 and control the power machine 10 by manipulating control devices (not shown in FIG. 1) located therein to send operator input signals to the drive system. Although the power machine 10 is shown having a plurality of wheels 14, it should be appreciated that power machine 10 need not have wheels. As one alternative example, power machine 10 can be equipped with one or more tracks that are configured to engage a supporting surface, such as ground, to propel the power machine over the supporting surface.

Power machine 10, as illustrated in FIG. 1, further includes a lift arm 18. Lift arm 18 is coupled to frame 12 at pivot point 26. Actuator 20 is coupled to the frame 12 at first pivot point 22 and the lift arm at second pivot point 24. Actuator 20, of the power machine 10 shown in FIG. 1 is a hydraulic cylinder, although other suitable types of actuators may be used. A single lift arm 18 is shown in FIG. 1, but it is to be understood that a similar lift arm 18 and corresponding actuator 20 may be positioned on the opposite side of the cab and similarly attached to frame 12. Further, it should be understood that such a lift arm may be coupled to the lift arm 18 shown in FIG. 1 via a cross-member (not shown) extending between and attached to each of the lift arms 18.

Power machine 10 further includes an attachment interface 28, which is rotatably coupled to the lift arm 18 about attachment point 30. One or more tilt actuators (not shown) are coupled to the attachment interface 28 and the one or more lift arms 18 (or the cross-member therebetween). Actuation of the one or more tilt actuators causes the attachment interface 28 to rotate about the attachment point 30 in a direction shown by arrow 38. Attachment interface 28 is configured to engage and be attached to a variety of different work implements such as a bucket, a planer, a post-hole auger, and the like. By utilizing the various attachments available to be connected to the power machine 10 at attachment interface 28, the power machine 10 provides a desirable and suitable tool to accomplish a number of different types of tasks. For example, by attaching a bucket (not shown) to power machine 10, an operator is capable of digging earth, moving material, and any number of tasks related to landscaping, construction, material removal, or any number of different types of applications.

The power machine 10 has a proximal end 40 and a distal end 42. An accessible engine compartment is located toward the distal end 42 of the power machine 10. The engine compartment is accessible via an aperture normally covered by a tailgate 44. The tailgate 44 is illustratively a latchable hinged door. The power machine 10 has a first side 46 and an opposing second side, not shown in FIG. 1. The power machine 10 has a top 48 and a bottom 50, which are defined for the purposes of this discussion.

The power machine 10 illustrated in FIG. 1 is a skid steer loader. A skid steer loader has rigid axles coupled to each of the wheels 14. The wheels 14 on each side of the skid steer loader are operably coupled to each so that they operate in tandem. Each side of the skid steer loader has its own drive system, which supplies power to the wheels on that particular side. Steering is accomplished by controlling the drive system of one or both sides of the machine to cause the machine to skid on the supporting surface in a direction that is desired by the operator.

As one illustrative example, an operator wishing to move or turn power machine 10 to the right may cause the wheels 14 on the left side of the power machine 10 to move in a forward direction. In addition, the operator can cause the wheels 14 on the right side to move in a reverse direction, not at all, or in a forward direction at a lesser rate of speed than the left side wheels 14. The net effect is a forward force applied to the left side of the power machine 10 that is greater than the forward force applied to the right hand side. As a result, the power machine 10 will skid on its wheels 14 to the right. This is just one non-limiting example of how a skid steer loader can be operated. Other steering operations can be employed to accomplish a right turn, for example. Although the illustrative example of the power machine 10 in FIG. 1 is a skid steer loader, the discussion provided in this document need not be limited to skid steer loaders. Alternatively, and without limitation, the discussion herein can be applied to other power machines such as wheeled loaders with a front or rear steerable axle, excavators, utility vehicles, all-wheel steer vehicles, tracked loaders, or any other similar power machine.

Figure 2:
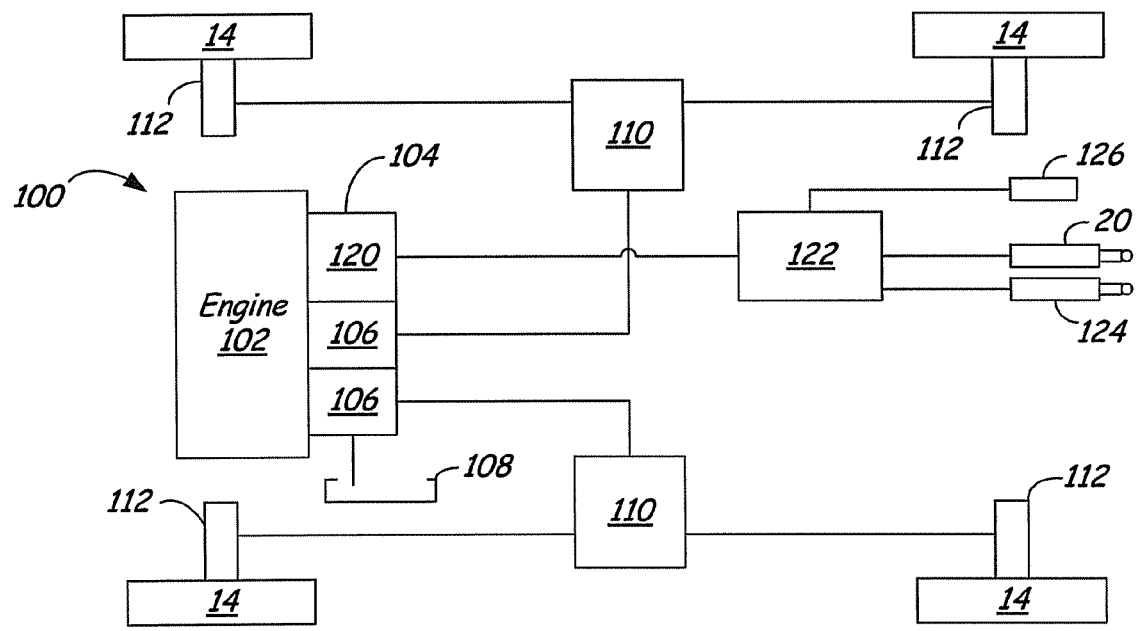
FIG. 2 is a block diagram that provides a schematic illustration of a power system for the loader of FIG. 1.

FIG. 2 is a block diagram of a portion of a power system 100 for power machine 10 according to one illustrative embodiment. Power system 100 includes an engine 102, which generates power for various functions on power machine 10. Power system 100 also includes a transmission package 104, which is operably coupled to the engine 102. Transmission package 104 is powered by the engine 102 and illustratively provides power to cause the power machine 10 to move when desired. Transmission package 104, as is illustrated in FIG. 2 includes a pair of hydrostatic drive pumps 106, each of which are capable of providing power in the form of hydraulic fluid received from a hydraulic reservoir 108 to hydraulic motors 110. Each of the hydraulic motors 110 are, in turn, operably coupled to a pair of axles 112 located on one side of power machine 10. Each axle 112 is coupled to a wheel 14. Hydraulic fluid provided to either or both of the hydraulic motors 110 causes each of the axles 112 to rotate the wheels 14 in one of a forward or reverse direction.

Transmission package 104 also illustratively includes a hydraulic pump 120, which is configured to receive hydraulic fluid from hydraulic reservoir 108 and port it to a control valve 122. The control valve 122 is capable of providing hydraulic flow to actuators 20 and 124 in response to signals provided by an operator of power machine 10. Actuator 20, as discussed above, controls the position of lift arm 18 and can include a pair of hydraulic cylinders one of which is disposed on either side of the power machine 10. Actuator 124, in one embodiment represents one or more hydraulic cylinders that, when actuated, cause the attachment interface 28 to rotate about the attachment point 30. The control valve 122, in one embodiment is capable of providing hydraulic fluid to a port 126 in response to user signals. Port 126 can be connected to one or more external devices to the power machine 10 so that an operator can control such external devices. One type of external device is an attachment such as a planer or posthole auger that can be coupled to the attachment interface 28. There are any number of different attachments that can be coupled to the attachment interface 28 and planers and post-hole augers are but two non-limiting examples.

It should be appreciated that the power system 100 illustrated in FIG. 2 is but one arrangement of a power system that can benefit from the embodiments discussed herein. Different arrangements of hydraulic motors, such as an individual hydraulic motor for each wheel, different traction devices such as tracks, different steering arrangements such as a steerable axle or all wheel steer are all contemplated, as well as many other arrangements. The embodiments discussed herein are for illustrative purposes only.

Figure 3:
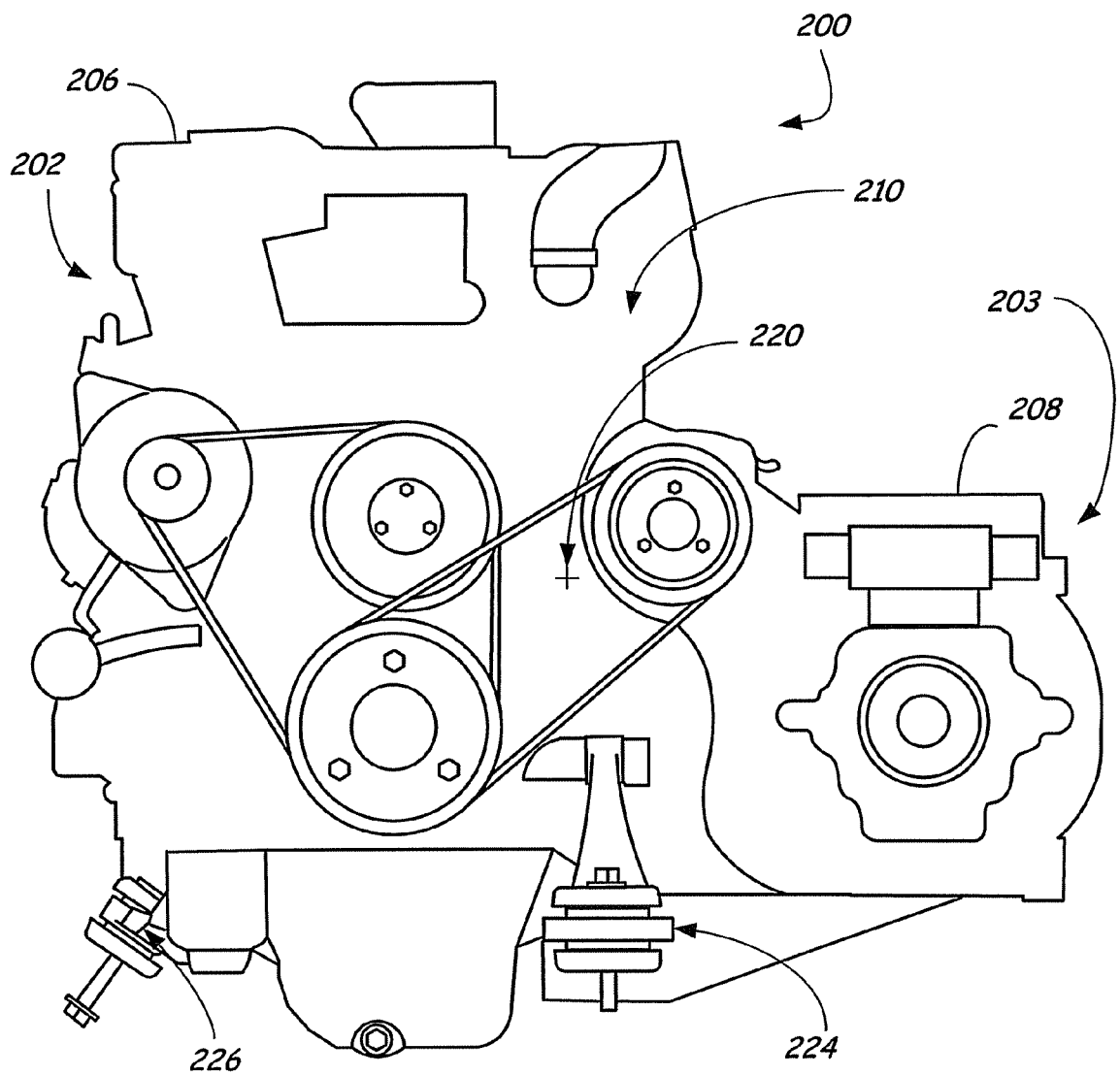
FIG. 3 is a side elevation view of an outline of an engine and hydraulic pump system illustrating connection points for attaching the engine and hydraulic pumps to a frame of a power machine according to one illustrative embodiment.
Figure 4:
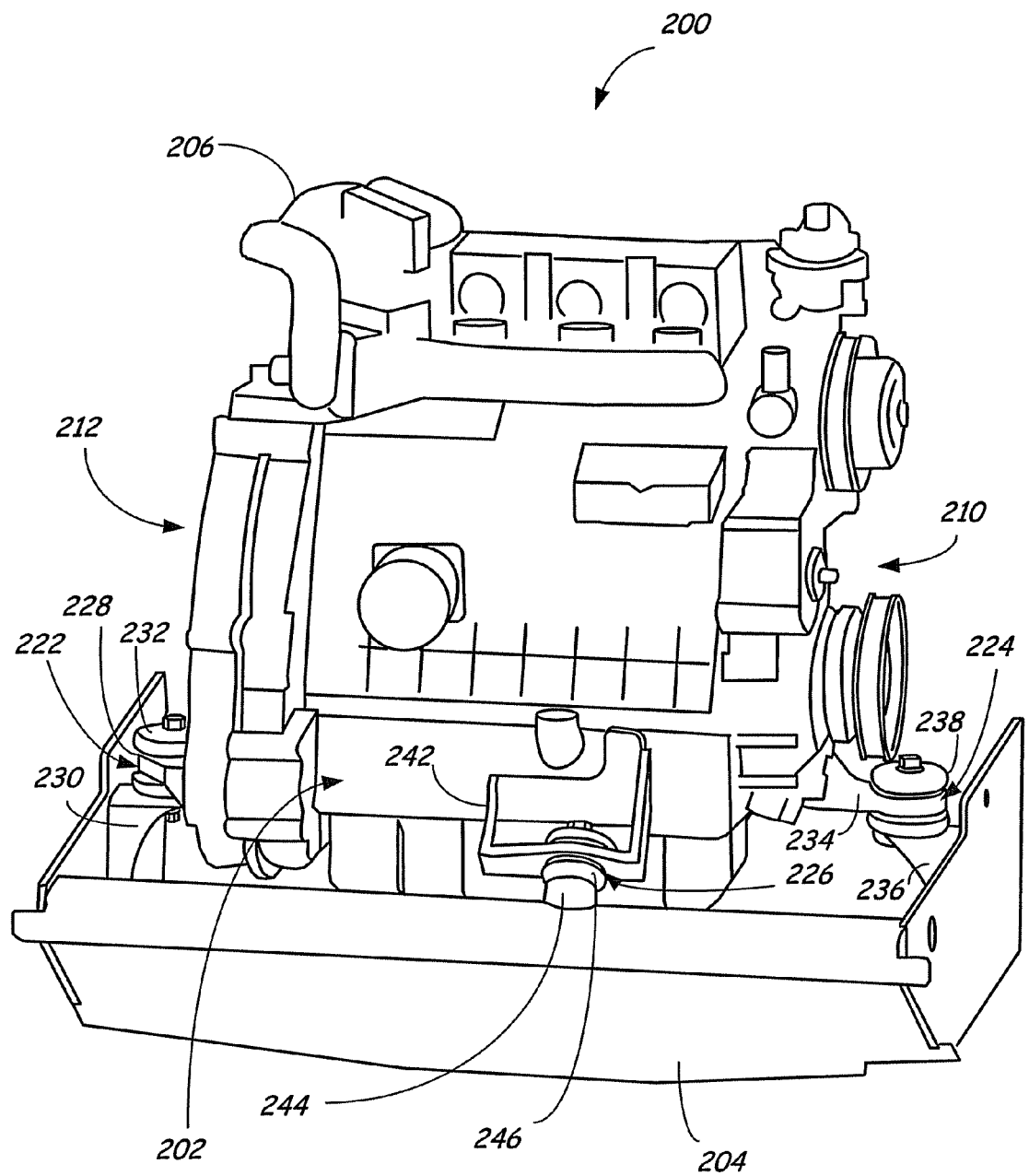
FIG. 4 is a perspective view of the outline of an engine and hydraulic pump system taken from a distal end illustrating connection points for attaching the engine and hydraulic pumps to a frame of a power machine according to one illustrative embodiment.

The power system diagrammed in FIG. 2 is illustratively coupled to the frame of a power machine. FIG. 3 is a side elevation view of an exemplary power system 200 according to one embodiment and FIG. 4 is a perspective view of the power system 200 taken from generally a distal end 202 of the power system 200. The power system 200 is coupled to a frame 204, which corresponds to the frame 12 discussed in FIG. 1. The power system 200 includes an engine 206 and a transmission system 208. The orientation of the power system 200 with respect to the frame 204 is such that the transmission system 208 is positioned towards a proximal end 203 and the engine 206 is positioned towards the distal end 202. A second side 210, which opposes a first side 212 of the power system 200 is shown in the side elevation view. It should be appreciated that the description of the orientation of power system 200 herein describes how the power system 200 is intended to be positioned within a power machine such as power machine 10 illustrated in FIG. 1.

The power system 200 has a center of gravity 220. The center of gravity 220 is illustratively the center point of the mass of the power system 200, including the engine 206 and the transmission system 208.

The power system 200 is illustratively attached to the frame 204 at first, second, and third connection points, 222, 224, and 226, respectively. The first connection point 222 includes a bracket 228 extending from, and attached to, the engine 206 and a bracket 230 extending from, and attached to, the frame 204 on the first side 212 of the frame 204. An engine isolation mount 232 is positioned between and attached to each of brackets 228 and 230. Any suitable isolation mount may be used between the two brackets 228 and 230. The second connection point 224 includes a bracket 234 extending from, and attached to, the engine 206 and a bracket 236 extending from, and attached to, the frame 204 on the second side 210 of the frame 204. An engine isolation mount 238 is positioned between and attached to each of brackets 232 and 234. Isolation mount 238 is illustratively similar to the isolation mount 232.

The first connection point 222 and the second connection point 224 are illustratively positioned on opposing sides of the center of gravity 220. In addition, each of the first connection points 222 and 224 are positioned nearly directly beneath the center of gravity 220, but just slightly proximal of the center of gravity 220. In one illustrative embodiment, the first and second connection points 222 and 224 are located so that they are each substantially the same distance proximal from the center of gravity 220. Thus, the majority of the weight of the power system 200 is distributed onto the first and second connection points 222 and 224. The connection points 222 and 224 are also positioned lower than the center of gravity 220. By lower than the center of gravity, it is to be understood that the first and second connection points 222 and 224 are positioned closer to the bottom 48 of a power machine 10 as the term bottom is discussed above.

The third connection point 226 is illustratively located toward a distal end 202 of the power system 200. The third connection point 226 includes a bracket 242 extending from, and attached to, the engine 206 at a distal end 202 of the power system 200. In addition, a connection interface 244 is located on the frame 204. The third connection point 226 further includes an isolation mount 246 located between the bracket 242 and the connection interface 244. The third connection point 226 is located distally from and below the center of gravity 220. A relatively small amount of the weight of the power system 200 is borne by the third connection point 226.

Figure 5:
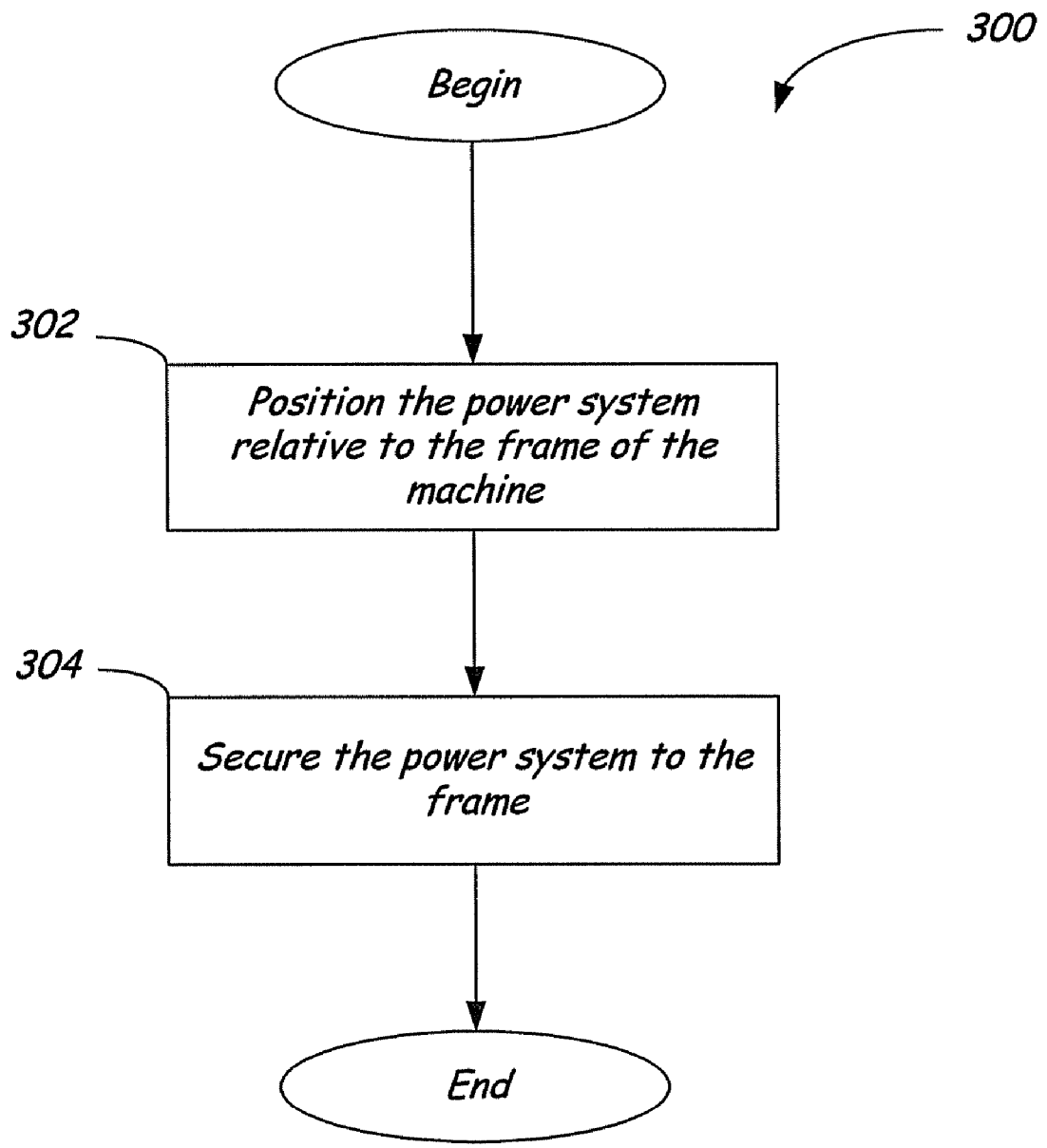
FIG. 5 is a flowchart illustrating a method of attaching a power system to the frame of a loader according to one illustrative embodiment.

FIG. 5 is a flowchart illustrating a method 300 of securing a power system to the frame of a power machine. The method includes positioning the power system (such as power system 200) in a desired location. This is illustrated at block 302. As discussed above, the desired location is one where the power system is capable of being secured to the frame of the power machine at two connection points that are nearly directly in line with, but slightly proximal to, the center of gravity of the power system. Once the power system is properly positioned, the power system is secured to the frame. This is illustrated at block 304. In one illustrative embodiment, securing the power system to the frame includes attaching the power system to the frame at the two connection points that are slightly proximal to the center of gravity and at a third connection point distal to the center of gravity of the power system. Further, attaching the power system to the frame at each of three connection points includes attaching at three connection points located below the center of gravity. Further still, attaching the power system to the frame at each of three connection points includes attaching the power system at locations on the engine. By attaching the power system to the frame at these three connection points, the transmission system is attached to the frame only through its direct attachment to the engine.

The embodiments discussed above provide important advantages. By providing attachment arrangements and methods as discussed above, the power package will be more isolated from the frame and therefore less susceptible to the effects of shock from any impacts that might power machine might undergo. Conversely, the vibrations created by the operation of the power system will be more thoroughly isolated from other components on the power machine. Although specific embodiments are disclosed above, it should be understood that the embodiments are illustrative in nature. Other embodiments that are within the spirit and similar to those presented here will be apparent to those skilled in the art.

What is claimed:

1. A loader having a frame with a proximal end, a distal end, and first and second opposing sides, an engine, a drive system operably coupled to the engine for causing the loader to move relative to a support surface, wherein the drive system includes an arrangement of one or more hydraulic pumps attached to the engine to form, with the engine, a power system, wherein the power system is positioned within the frame of the loader, and comprising:
   an attachment system to fasten the power system to the frame, having first and second connection points positioned in close proximity to a center of gravity of the power system relative to the direction between the proximal and distal ends of the loader and a third connection point positioned distally from the first and second connection points, wherein the positions of the first, second and third connection points connect the power system to the frame to allow most of the weight of the power system to be loaded onto the first and second connection points.

2. The loader of claim 1, wherein the first and second connection points are each positioned slightly proximal of a position of the center of gravity relative to the direction the proximal and distal ends of the loader.

3. The loader of claim 1, wherein the first and second connection points are positioned below the center of gravity.

4. The loader of claim 3, wherein the third connection point is positioned below the center of gravity.

5. The loader of claim 1, wherein the hydraulic pumps are not directly attached to the frame.

6. An attachment system for attaching a power system to a frame of a power machine having a proximal and a distal end, opposing first and second sides, and a top and a bottom, the power system including an engine and one or more hydraulic pumps attached to the engine, wherein the power system has a center of gravity defined by the distribution of mass in the engine and the one or more hydraulic pumps with respect to a proximal to distal direction, a first to second side direction and a top to bottom direction, the attachment system comprising:
   first and second connection points for connecting the power system to the frame, wherein each of the first and second connection points are positioned on opposing sides of and in close proximity to the center of gravity with respect to the proximal to distal direction of the power system; and
   a third connection point for connecting the power system to the frame located away from the center of gravity towards the distal end in the proximal to distal direction.

7. The attachment system of claim 6, wherein the first and second connection points are positioned to attach the power system to the frame of the loader closer to the bottom of the loader than the center of gravity in the top to bottom direction.

8. The attachment system of claim 7, wherein the third connection point is positioned to attach the power system to the frame of the loader at a location closer to the bottom of the loader than the center of gravity in the top to bottom direction.

9. The attachment system of claim 6, wherein the first and second connection points are positioned to attach the power system to the frame at locations closer to the proximal end of the loader in the proximal to distal direction.

10. The attachment system of claim 6, wherein the first, second and third connection points are positioned to cause most of the load of the power system to be distributed onto the first and second connection points when the power system is attached to the frame.

11. A method of attaching a power system to a frame of a loader, comprising:
   positioning the power system, which includes an engine and one or more hydraulic pumps coupled to the engine, relative to the frame so that the power system can be attached to the frame at selected first, second, and third connection points on the power system, wherein:
      the first and second connection points are positioned on opposing sides of a center of gravity of the power system and in close proximity to the center of gravity of the power system as it relates to a proximal to distal direction of the frame; and
      the third connection point is positioned toward a distal end of the frame relative to the center of gravity of the power system; and
   attaching the power system to the frame at the first, second and third connection points.

12. The method of claim 11, wherein the selected first and second connection points are positioned so that when the power system is attached to the frame, the first and second connection points are below the center of gravity of the power system.

13. The method of claim 11, wherein the selected third connection point is positioned so that when the power system is attached to the frame, the third connection point is below the center of gravity of the power system.

14. The method of claim 11, wherein the selected first and second connection points are positioned so that when the power system is attached to the frame, the first and second connection points are proximal to the center of gravity of the power system.

* * * * *